United States Patent Office 3,377,295
Patented Apr. 9, 1968

3,377,295
PROCESS FOR MAKING HIGH STRENGTH MOLECULAR SIEVE NODULES AND EXTRUDATES
James N. Pryor, Baltimore, Md., assignor to W. R. Grace & Co., New York, N.Y., a corporation of Connecticut
No Drawing. Filed Dec. 17, 1964, Ser. No. 419,213
4 Claims. (Cl. 252—455)

ABSTRACT OF THE DISCLOSURE

Process for making high strength crystalline aluminosilicate nodules or extrudates using a binder comprising an organic nitrogen compound, such as urea, and an alkali metal silicate or an alkali metal aluminate. The process comprises the steps of mixing a solution comprising an organic nitrogen compound with the crystalline aluminosilicate and then forming nodules or extrudates, drying the nodules or extrudates to decompose the organic nitrogen compound, aging the nodules in atmospheric air, washing the nodules, and then drying and activating the nodules by heating. The process is particularly characterized by the aging step.

---

This invention relates to a process for preparing crystalline aluminosilicates of the molecular sieve type in the form of nodular bodies. In one specific embodiment, it relates to a method of preparing formed molecular sieves by a process wherein the formed bodies are prepared without the necessity of using clay as a binder.

The zeolitic crystalline aluminosilicates are differentiated from the amorphous aluminosilicates by their crystalline structure. The crystalline aluminosilicates have achieved a commercial status because of their usefulness in certain separation processes. The crystalline aluminosilicates have also been used as components of certain types of catalysts.

Three types of these zeolites have found commercial acceptance and are widely used in separation processes. The zeolite we designate as Z-12 has a silica to alumina ratio of about 2.0. This product is also described as type 4A by the Linde Division of Union Carbide Corporation. Another zeolite of commercial interest is the zeolite we designate Z-14. This material is designated as type "X" by the Linde Division of Union Carbide Corporation. This zeolite has a silica to alumina ratio of 2.5±0.5. The third type is the zeolite we designate Z-14HS. This zeolite has a silica to alumina ratio of greater than 3 to 6, and is designated type "Y" by Linde Division of Union Carbide Corporation.

When these zeolitic crystalline aluminosilicates are to be used in separation processes, it is frequently desirable that they be in the form of nodules. This requires the use of a binder. In the early work in this field, the zeolites were formed using clay or other inorganic materials as a binding agent to bind the particles of the zeolite together to prepare the formed zeolitic bodies. The use of these inorganic materials has been found undesirable. Because they are present as a diluent in the final product, the separation efficiency of the zeolite is reduced proportionately. Thus, a nodular zeolite containing 10% clay as a binder would have its separation efficiency reduced by at least 10% as compared to the separation efficiency of the product that does not contain clay.

We have found that zeolitic crystalline aluminosilicates can be prepared in the form of nodules, pills, extrudates, etc. by the use of certain organic nitrogen compounds in a solution of an alkali metal silicate or alkali metal aluminate. The most important component of the binding materials are the organic nitrogen compounds. We have found that the particularly good results are achieved when this organic nitrogen reagent is urea. The organic nitrogen reagent must be one that breaks down at temperatures in the order of about 250° C. to 270° C. in an alkaline medium to release ammonia. Other organic nitrogen compounds useful in this process include ammonium carbamate, potassium cyanate, hexamethylene tetramine, acetamide and formamide.

The organic nitrogen compound is mixed with an aqueous solution of alkali metal silicate or alkali metal aluminate. Because of their ready availability and economic advantage, sodium silicate and sodium aluminate are the preferred reactants, although other alkali metal silicates and alkali metal aluminates would give satisfactory results. For purposes of simplicity, my process will be described using a sodium silicate and urea. The steps of the process are essentially the same when other organic nitrogen compounds or sodium aluminate are used in the process.

I have found that commercially available 40° Baumé sodium silicate is a particularly desirable source of silicate. The sodium silicate may be more dilute since additional water is normally added in the preparation of the binding agent solution. A 40° Baumé solution contains about 28 weight percent $SiO_2$. The sodium silicate and urea are mixed in the stoichiometric quantities required to form sodium carbonate. On a molar bases, the stoichiometric amount of sodium silicate solution is that quantity of solution that contains 0.95 mole of $SiO_2$ per mole of urea. It is preferable to have a slight excess of urea present in the solution. This excess may vary from 0.05 mole to 0.1 mole over the stoichiometric amount of urea required for the reaction.

In the preparation of the silicate urea mixture, each liter of the sodium solution silicate is diluted with about 220 ml. of water. A suitable binding solution can be prepared, if the sodium silicate solution is diluted with up to 440 ml. of water per liter of solution.

After the binding agent solution is prepared, the next step in the process is the forming step. In this step, the zeolitic aluminosilicate is mixed with the binding agent solution and formed as nodules, extrudates, pills, etc. The conventional method of effecting this forming is to mix the binding agent solution with the zeolite to form a paste. This paste is then formed into balls, extrudates, pills, etc.

A convenient method of preparing these nodular materials is to mix a portion of the binding solution with the zeolite to form a paste. After the paste is formed, additional quantities of the zeolite are added and the mixture is formed into nodules. After the nodules are formed, a sufficient quantity of the dry powder is added to the paste of the zeolite with the binding solution to cause agglomeration of the paste with the dry powder and formation of nodules of the zeolite.

This is best done visually and the zeolite powder added to the binding solution until nodules are formed, since the amount required varies with the type of zeolite. Thus, the preparation of the nodular type X zeolite requires slightly more than half the quantity of the zeolite powder to form nodules than is required when the nodules were formed with the type A zeolite. In the process for preparing nodules of Type A zeolite, for example, we found that 700 grams of zeolite mixed with 660 ml. of the binding agent solution gave a satisfactory paste. If an additional 1600 ml. of dry powder was added to this paste, satisfactory nodules were formed. This amount could be increased to 2100 grams without any deleterious effect.

After the nodules are formed, a slight amount of dry powder may be added to prevent agglomeration of the nodules prior to the drying and decomposition step.

The formation of the nodules is normally carried out in a conventional mixer. A suitable mixer is the commercially available mixer known as a "Pony Mixer." This mixer utilizes the "change-can" mixing principle and incorporates planetary mixing action through a combination of agitator rotation against can rotation. This action of the mixer facilitates the preparation of the nodules of the zeolite paste.

The preparation of the solution and the forming steps are normally carried out at room temperature and atmospheric pressure. Although the process is obviously operative at increased temperature and pressure, no advantage is achieved by operating at conditions other than room temperature and atmospheric pressure.

After the zeolite is formed in the desired shape, the next step is the drying and decomposition step. This step achieves the setting of the binder in the sieves. The temperature must be high enough to decompose the urea into ammonia and to form sodium carbonate. The drying and decomposition step is conveniently carried out for a period of 16 hours at temperatures of 270° F. However, drying at temperatures of 270° to 400° F. for 24 hours to 2 hours also gives satisfactory results.

If desirable, the nodules may be separated by size at this point. A desirable nodular material is the 6 to 8 mesh nodules. Nodules in this size range are convenient separated after the drying step.

The essential feature of this invention resides in the next step of the process. We have found that if the dried material is aged at room temperature by being exposed to atmospheric air until no decrepitation is detected when the nodules are placed in water, a product with a high crushing strength is obtained. This step is normally completed in about 24 hours. This remarkable improvement in the crushing strength of the final product is achieved due to the fact that the formed zeolite immediately after drying is in a somewhat activated state. It rapidly adsorbs large quantities of water in the washing step which tends to increase the crushing strength of the product. When the water is adsorbed more slowly, as by exposing the formed nodules to air for the desired period of time, the washing can be carried out without loss of crushing strength of the final product.

After the air equilibration step, the formed zeolite is washed. This washing is carried out to remove the sodium carbonate, formed in the reaction, from the nodules. This washing is conveniently carried out using deionized water. The best criterion for determining adequate washing is pH control. The best results were obtained when the nodules are washed until the wash water has a pH of about 9.

After the zeolite is washed, it is dried. Nodular zeolites have been prepared by drying to remove water for periods as long as 16 hours at 270° F. The only purpose of the drying at this stage is to remove the water still retained in the nodules. The drying can be carried out with temperatures as low as about 100° F. if the drying is carried out for protracted periods of time such as about 48 hours, for example. Satisfactory results are achieved with drying for 16 hours at 270° F.

The final step in the process is activation of the zeolite. Satisfactory results are obtained if the formed zeolitic material is activated for periods of about 2 hours at 900° F. However, this activation may be carried out at temperatures of from 700 to 900° F. for from 24 hours to 2 hours.

The invention is further illustrated by the following specific but non-limiting examples.

Example I

This example shows the preparation of the binding agent solution and the preparation of the nodular zeolite. The binding agent solution was prepared by dissolving 66 g. of urea in 120 ml. of water. This solution was mixed with 500 ml. of 40° Baumé sodium silicate solution. Nodules of the zeolite were formed by adding 780 g. of the dry zeolite to 660 ml. of the binder solution. This slurry was formed into a paste in a conventional Pony Mixer by mixing the components for a period of about 45 minutes. After a good paste has been formed, an additional 600 g. of the powder was added and nodules of the zeolite were allowed to form. After the nodules had formed, the mixture was run for an additional period of 30 minutes to further round the nodules and a small amount, approximately 50 g. of the dry powder was added to prevent agglomeration. This mixing was continued for a period of about 10 minutes. No additional improvement in the forming of the material was seen after that period of time. The formed zeolite was then removed from the mixer and dried for 16 hours at a temperature of 270° F. The dried nodules were then screened to separate the nodules in the 4–8 mesh size range. The nodules were air equilibrated by exposing the dried material to air for a period of 24 hours, followed by washing with water for a period of 24 hours in a conventional Buchner funnel. At the end of this time, the pH of the wash was 9.0. The washed nodules were then dried for 16 hours at 270° F. and activated for 2 hours at 900° F.

Example II

This example shows the preparation of formed nodules of zeolite A. In this run, 700 g. of the zeolite were mixed with 600 ml. of the binding agent solution to prepare a paste. An additional 825 g. of the zeolite were added and the zeolite was formed into nodules as in Example I. The other steps in this preparation were exactly the same as in Example I. The product was initially dried for a period of 16 hours at 270° F., air equilibrated by exposure to air for a period of 24 hours, washed with water, dried and activated.

Example III

This example shows the preparation of these materials as extrudates rather than in the form of nodules. In this run, the paste was formed using the same ratios of zeolite and binding agent as in Examples I and II. After the additional zeolite was added and the nodules had formed, the product was removed from the mixture and extruded through a ⅛″ die in a conventional pellet mill. The extrudates were then dried for 16 hours at 270° F., equilibrated with air for 24 hours, washed with water for a period of 24 hours, dried for 16 hours at 270° F., and activated for 2 hours at 900° F. as in Examples I and II.

Example IV

This example illustrates the advantage of the processes of instant application over process of the prior art and the improvement in the product by the inclusion of the air equilibration step. In this series of examples, the products were formed in three separate processes. In the first series of preparations, the zeolite was formed with the binding agent solution separated into nodules in the 4–8 mesh size range, and dried immediately for 16 hours at 270° F. The crushing strength of these dried, unwashed pellets was determined and found to be, on the average 7.7 pounds. The range of the crushing strength was from 4 to 12 pounds. The crushing strength was determined as side crushing strength determination in contrast to end crushing strength. The crushing strength was determined by exerting the amount of force necessary to crush the nodule or extrudate and this number recorded as the crushing strength in pounds.

To afford comparison of these materials with the washed materials wherein the zeolite was washed immediately after the initial drying, the product was prepared as in Example II and washed until the pH of the wash water was 9.0 over a period of about 24 hours. The washed product was then dried at a temperature of 270° F. and activated for 2 hours at 900° F. The crushing strength of these nodules was determined and found to be less than 1 pound.

The tremendous advantage obtained by the inclusion of the air equilibration step in the process was demonstrated by determining the crushing strength of the product of Example II. The washed and dried products were found to have an average crushing strength of 5.4 After the materials were activated by heating for 2 hours at 900° F., the average crushing strength was found to be 6.3 pounds.

The product prepared in the process which included the air equilibration step thus had a crushing strength of six times the crushing strength of the product prepared when the zeolite was washed immediately after the drying step. The inclusion of the air equilibration step in our process thus prepares a product that has a crushing strength sufficiently high to be useful in various adsorption processes.

Example V

This example illustrates the inclusion of an air equilibration step in the preparation of extrudates and the advantage of this step in the process of the instant invention. In this run, the extrudates were prepared using the process described in Example III. The paste was formed using the same ratio of zeolite and binding agent as in Examples I and II. After the additional zeolite was added and the nodules were formed, the product was removed from the mixture and extruded through a ⅛" die in a conventional pellet mill. The extrudates were then dried for 16 hours at 270° F. One portion of these materials were washed immediately after drying and the crushing strength of the product was determined. This same portion was activated for 2 hours at 900° F. and the crushing strength of the product determined. A third portion was air equilibrated for a period of 24 hours and then washed and the crushing strength determined after drying at 270° F. This product was calcined for 2 hours at 900° F. and the crushing strength of the extrudates determined.

Table I.—Crushing strength of formed zeolites

| Method of Treatment: | Crushing strength in pounds; Strength in pounds |
|---|---|
| Not washed dried at 270° F. | 13.2 |
| Washed immediately after drying at 270° F. | <1 |
| Washed immediately after drying at 270° F., activated 2 hours at 900° F. | <1 |
| Washed after air equilibration and drying at 270° F. | 7.0 |
| Washed after drying and air equilibration, calcined 2 hours at 900° F. | 9.1 |

The necessity for inclusion of the equilibration step in the process of the instant application is apparent from an examination of the data set out in Table I. The extrudates that were washed immediately after drying had a crushing strength of less than 1 pound. The air equilibration step increased the crushing strength seven fold. It is apparent that the air equilibration step is necessary if a product with sufficient crushing strength for practical commercial use is to be prepared.

Obviously many modifications and variation of the invention as hereinabove set forth may be made without departing from the essence and scope thereof and only such limitations should be applied as are indicated in the appended claims.

What is claimed is:
1. A process for preparing nodular zeolitic aluminosilicates which comprises the steps of:
 (a) Preparing a binding solution comprises of an organic nitrogen compound selected from the group consisting of urea, ammonium carbamate, potassium cyanate, hexamethylene tetramine, acetamide, and formamide, and a solution of alkali metal salts selected from the group consisting of alkali metal silicate and alkali metal aluminate, wherein the organic nitrogen compound is present in an 0.05 to 0.1 molar excess of the stoichiometric amount needed to form alkali metal carbonate with the alkali metal salt.
 (b) Mixing the binding solution with sufficient zeolitic aluminosilicate to form nodules.
 (c) Drying the nodules at a temperature sufficient to decompose the urea and form sodium carbonate.
 (d) Aging the dried nodules in atmospheric air for at least about 18 to 24 hours.
 (e) Washing the nodules until the pH of the wash water is above about 8.8 but below 9.4.
 (f) Drying, activating and recovering the nodular zeolite product.

2. A process according to claim 1 wherein the organic nitrogen compound is urea and the alkali metal salt is alkali metal silicate.

3. A process according to claim 1 wherein the organic nitrogen compound is urea and the alkali metal salt is sodium aluminate.

4. A process for preparing nodular zeolitic aluminosilicates which comprises the steps of:
 (a) Preparing a binding solution composed of urea and sodium silicate, wherein the urea is present in an amount equal to about 0.05 mole in excess of the amount needed to form sodium carbonate with the sodium from the silicate.
 (b) Mixing the binding solution with sufficient zeolitic aluminosilcate to form nodules.
 (c) Drying the nodules at a temperature of at least about 270° F. to decompose the urea and form sodium carbonate.
 (d) Aging the dried nodules in atmospheric air for about 24 hours.
 (e) Washing the nodules with water until the pH of the wash water is about 9.0.
 (f) Drying the washed nodules at a temperature of about 100° C. to 240° C. for 24 hours to 6 hours.
 (g) Activating the dried nodules and recovering the nodular aluminosilicate product.

References Cited

FOREIGN PATENTS 1,161,869   1/1964   Germany.

DANIEL E. WYMAN, *Primary Examiner.*

CARL F. DEES, *Assistant Examiner.*